United States Patent [19]

Dunbar et al.

[11] 4,177,352

[45] Dec. 4, 1979

[54] SHEAR BOLT ASSEMBLY FOR A LOAD LIMITING LINE SUPPORT FOR A POST INSULATOR

[75] Inventors: David R. Dunbar, Pavilion, N.Y.; Edward J. Balog, Sr., McKeesport, Pa.

[73] Assignee: Interpace Corporation, Parsippany, N.J.

[21] Appl. No.: 909,487

[22] Filed: May 25, 1978

[51] Int. Cl.² .................. F16B 31/00; F16D 9/00; H01B 17/16; H01B 17/38
[52] U.S. Cl. .................... 174/1; 64/28 R; 85/1 T; 174/169; 248/64; 403/2
[58] Field of Search ............. 174/1, 138 D, 161 R, 174/169; 248/64; 52/98, 99; 64/28 R; 85/1 T, 61, 62; 285/2; 403/2, DIG. 3

[56] References Cited

U.S. PATENT DOCUMENTS

| 2,838,920 | 6/1958 | Hill, Jr. et al. | 64/28 R |
| 3,566,011 | 2/1971 | Pinkham et al. | 174/169 |

*Primary Examiner*—Laramie E. Askin
*Attorney, Agent, or Firm*—Charles E. Baxley

[57] ABSTRACT

A shear bolt assembly for a load limiting line support for a post insulator comprising a bolt having a first portion engaged with a saddle of the line support and a collar engaged by a line clamp. The collar is in abutting relation with the bolt and the collar and bolt have aligned axial bores in which a shear pin is secured. The shear pin can be secured in the collar and bolt by an adhesive layer and the shear pin can be brought into electrical contact with the bolt by providing a knurled section at one end which establishes interference fit and mechanical contact between the shear pin and the bolt.

5 Claims, 5 Drawing Figures

SHEAR BOLT ASSEMBLY FOR A LOAD LIMITING LINE SUPPORT FOR A POST INSULATOR

FIELD OF THE INVENTION

The invention is directed to a shear bolt assembly for a load limiting line support for a post insulator.

BACKGROUND

U.S. Pat. No. 3,566,011 discloses the construction of a load limiting line support for a post insulator of the type employed in the present invention and in this patent there is utilized a shear bolt which consists of a single bolt having a reduced section serving as the shear limiting means.

PRIOR ART STATEMENT

Numerous types of shear bolts in addition to that shown in the aforesaid patent are known. U.S. Pat. Nos. 2,316,720 and 3,599,528 are two examples of pin designs. However, these bolts are employed to relieve tension loads as distinguished from the shear bolts of the present invention which relieve shear loads disposed at 90° to tensile loads.

SUMMARY OF INVENTION

An object of this invention is to provide a construction of a shear bolt assembly which will be reliable to limit shearing capacity between two members and specifically between a line clamp and a support member of the line support assembly.

A further object of the invention is to provide a shear bolt assembly which is relatively suitable to manufacture and requires a minimum amount of machining.

Yet another object of the invention is to provide a shear bolt assembly in which the bolt itself will be formed throughout of stainless steel.

In order to satisfy the above and further objects of the invention, there is contemplated a shear bolt assembly for joining two members with a given shear strength capability, said assembly comprising a bolt including a first portion adapted for being engaged by one of the members being joined with given shear capability, said bolt having an axial bore therein extending partially along the length of the bolt, a collar disposed adjacent said bolt and adapted for being engaged by the other of the members to be joined with given shear capability, said collar having an axial bore therein which is aligned with the bore in the bolt with said collar in abutting relation with said bolt along a plane constituting the shear plane of the bolt assembly, and a shear pin extending in the axially aligned bores of the bolt and collar.

In further accordance with the invention, the shear pin can be secured in the collar and bolt by adhesive means. The adhesive means can be rendered electrically conductive in order to provide electrical conductivity between the shear pin and the bolt. Such electrical conductivity between the bolt and the shear pin is necessary in order to maintain both at the same electrical potential and avoid gapping therebetween. But in the event that the adhesive means is electrically insulative, the shear pin comprises means for providing electrical contact between the shear pin and the bolt. Such means for providing electrical contact can comprise a section on the shear pin providing interference fit and mechanical contact between the shear pin and the bolt. Such section advantageously can be knurled.

In a particularly advantageous embodiment, the bolt and collar are made of stainless steel and the shear pin is made of aluminum.

The invention will next be described in greater detail with reference to the attached drawings.

DETAILED DESCRIPTION

Figure 1:
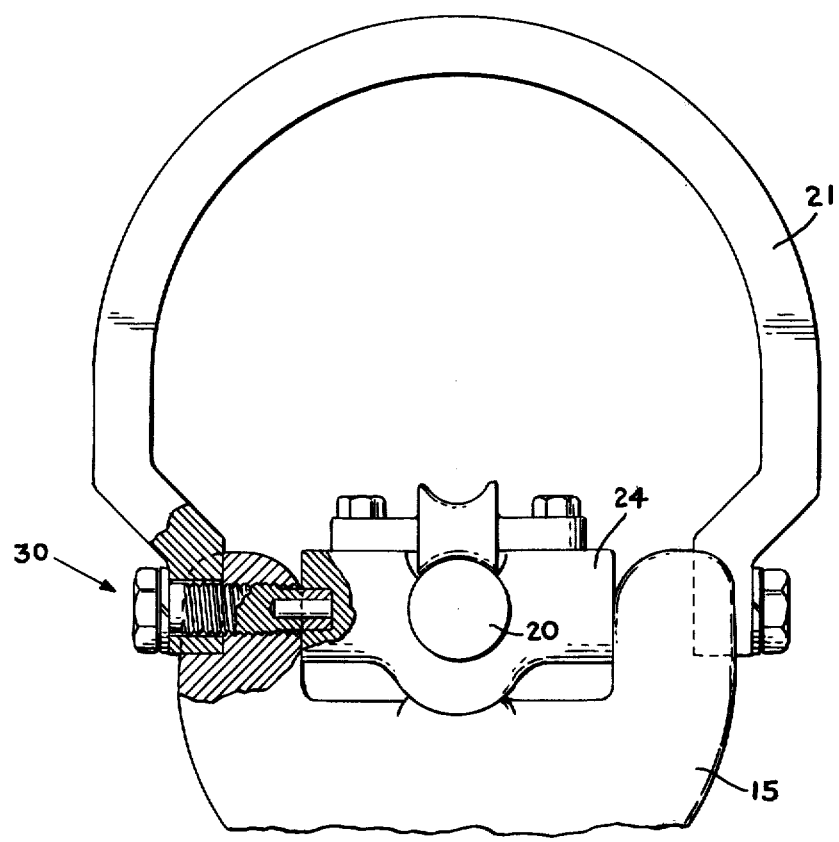
FIG. 1 is an elevational view partly broken away and in section showing a line support with the shear bolt assembly of the invention as viewed in the direction of line.
Figures 2, 3, 4:
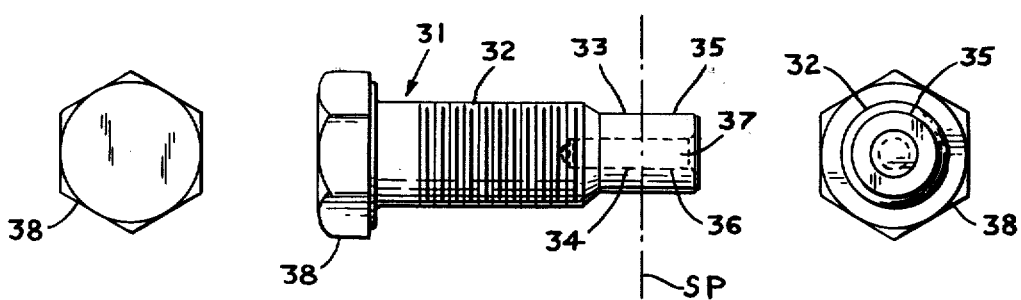
FIG. 2 is a side elevational view on somewhat enlarged scale of the shear bolt assembly of the invention shown alone.
FIG. 3 is a view from the left end of the shear bolt assembly.
FIG. 4 is a view from the right end of the shear bolt assembly.

The assembly as shown in FIG. 1 is similar to the assembly as shown in FIG. 1 of U.S. Pat. No. 3,566,011, and only so much of the assembly as will be necessary to understand the improvement of the present invention will be given thereafter.

In FIG. 1 there is shown a saddle 15 of a line support which is intended to be connected to a post insulator. A line 20 is secured in a clamp 24 and the clamp 24 is secured to the saddle 15 by means of the shear bolt assembly 30 of the present invention. The shear bolt assembly 30 also serves to secure a retainer loop 21 to the saddle 15.

Briefly, if line 20 is subjected to a stress approaching the breaking strength of the insulator to which the saddle 15 is secured, the shear bolt assembly 30 undergoes shear failure thereby releasing line clamp 24 from its connection with the saddle 15. The line clamp is then free to undergo longitudinal movement without the ability to impose any substantial loading on the insulator other than the weight of the conductor. The retainer loop 21 insures that the freed line will remain within the confines of the line support until it is manually repositioned on new shear bolt assemblies 30.

It is essential that the shear bolt assemblies 30 undergo shear failure at a stress less than the breaking strength of the insulator because failure of the insulator may cause cascading or progressive failures down the line.

The shear bolt assembly 30 comprises a bolt 31 having a threaded portion 32 which can be engaged threadibly in the saddle 15. The bolt has a smooth cylindrical reduced portion 33 at the end projecting from the threaded portion 32. The bolt is provided with an axial bore 34 extending partially along the length thereof. A collar 35 is in axial abutment with portion 33 of the bolt 31 and the collar is provided with an axial bore 36 which is aligned with the bore 34 in the bolt 31. The diameter of the collar 35 is substantially equal to the diameter of the smooth portion 33 of the bolt.

A shear pin 37 is disposed in bores 34 and 36 and serves as the shear limiting member of the shear bolt assembly. Failure of the shear pin 37 will take place along the shear plane SP which is the juncture plane between the cylindrical portion 33 of the bolt and the collar 35.

The bolt 31 is provided with a head 38 which secures the retainer loop 21 to the saddle 15.

In a particular embodiment the bolt 31 is made of stainless steel and the collar 35 is also made of stainless steel. The shear pin 37 is made of aluminum.

In order to secure the shear pin 37 within the coller 35 and the bolt 31, an adhesive layer 40 of a suitable epoxy resin or the like is interposed between the shear pin 37 and the collar 35 and bolt 31.

In order to establish electrical contact between the shear pin 37 and the bolt, the epoxy resin layer 40 can be provided with an electrically conductive material such as conductive carbon black.

Figure 5:
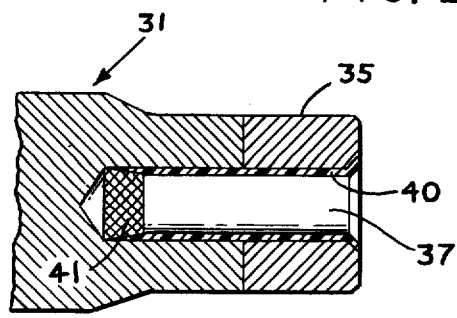
FIG. 5 is a section on enlarged scale through a portion of the shear bolt assembly showing a detail thereof.

An alternative arrangement, however, is also possible and with reference to FIG. 5 it is seen that the shear pin 37 can be formed with a slightly enlarged section 41 to create a slight interference fit between the shear pin 37 and the bolt 31 to provide mechanical contact between the shear pin and the bolt. Preferably, the section 41 is knurled as this will provide the sufficient enlargement of the shear pin starting from a cylindrical section. The epoxy layer 40 without conductive carbon black can still be employed for mechanical strength and to provide a cushioning effect against fatigue.

Although the invention has been described in conjunction with a preferred embodiment thereof, it will become apparent to those skilled in the art that numerous modifications and variations can be made without departing from the scope and spirit of the invention as defined in the attached claims.

We claim:

1. A shear bolt assembly for joining two members with a given shear strength capability, said assembly comprising a bolt including a first portion adapted for being engaged by one of the members being joined with given shear capability, said bolt having an axial bore therein extending partially along the length of the bolt, a collar disposed adjacent said bolt and adapted for being engaged by the other of the members to be joined with given shear capability, said collar having an axial bore therein which is aligned with the bore in the bolt with said collar in abutting relation with said bolt along a plane constituting the shear plane of the bolt assembly, a shear pin extending in the axially aligned bores of the bolt and the collar, and adhesive means securing said shear pin in said collar and bolt.

2. A shear bolt assembly as claimed in claim 1 with the adhesive means being electrically conductive.

3. A shear bolt assembly as claimed in claim 1 wherein said adhesive means is electrically insulative, said shear pin comprising means for providing electrical contact between the shear pin and the bolt.

4. A shear bolt assembly as claimed in claim 3 wherein said means for providing electrical contact between the shear pin and the bolt comprises a section on said shear pin providing interference fit and mechanical contact between said shear pin and the bolt.

5. A shear bolt assembly as claimed in claim 4 wherein said section on said shear pin is a knurled section.

* * * * *